United States Patent
Prologo et al.

(10) Patent No.: US 7,620,809 B2
(45) Date of Patent: Nov. 17, 2009

(54) METHOD AND SYSTEM FOR DEVICE REGISTRATION WITHIN A DIGITAL RIGHTS MANAGEMENT FRAMEWORK

(75) Inventors: Richard D. Prologo, Sammamish, WA (US); Eduardo P. Oliveira, Redmond, WA (US); Clifford P. Strom, Sammamish, WA (US); Brian P. Evans, Redmond, WA (US); Benjamin Brooks Cutter, Kirkland, WA (US); Anand D. Paka, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 812 days.

(21) Appl. No.: 11/107,513

(22) Filed: Apr. 15, 2005

(65) Prior Publication Data

US 2006/0236097 A1 Oct. 19, 2006

(51) Int. Cl.
*H04L 9/00* (2006.01)
(52) U.S. Cl. ............... 713/156; 713/155; 713/165; 713/168; 713/175; 380/43; 726/4
(58) Field of Classification Search .......... 713/156
See application file for complete search history.

(56) References Cited

U.S. PATENT DOCUMENTS

| | | | |
|---|---|---|---|
| 5,715,403 A * | 2/1998 | Stefik ............... | 705/44 |
| 7,024,393 B1 * | 4/2006 | Peinado et al. ....... | 705/59 |
| 7,103,574 B1 * | 9/2006 | Peinado et al. ....... | 705/51 |
| 2002/0002674 A1 * | 1/2002 | Grimes et al. ........ | 713/156 |
| 2004/0080541 A1 * | 4/2004 | Saiga et al. .......... | 345/805 |
| 2004/0088541 A1 * | 5/2004 | Messerges et al. ..... | 713/156 |
| 2005/0005114 A1 * | 1/2005 | Medvinsky ........... | 713/168 |
| 2005/0114896 A1 * | 5/2005 | Hug et al. ............ | 725/88 |
| 2005/0135613 A1 * | 6/2005 | Brandenburg et al. ... | 380/43 |
| 2005/0138357 A1 * | 6/2005 | Swenson et al. ....... | 713/155 |
| 2005/0182931 A1 * | 8/2005 | Robert et al. ......... | 713/168 |

(Continued)

FOREIGN PATENT DOCUMENTS

WO WO 00/59150 10/0000

(Continued)

OTHER PUBLICATIONS

Hong, S. et al., "On the construction of a powerful distributed authentication server without additional key management", *Computer Communications*, 2000, 23, 1638-1644.

(Continued)

*Primary Examiner*—Kambiz Zand
*Assistant Examiner*—Yonas Bayou
(74) *Attorney, Agent, or Firm*—Woodcock Washburn LLP (57) ABSTRACT

A method of registering network devices in a digital rights management system (DRMS) includes receiving a digital certificate transmitted by the network device requesting registration and verifying the validity of the certificate. The DRMS may then send cryptographic information to the applying network device. The network device may be authorized for registration via a user interface to the DRMS. The DRMS may conduct a proximity test to determine of the network device is proximate to the DRMS. If the certificate is validated, authorization is received, and the proximity test indicates that the network device is proximate to the DRMS, the network device may be registered. A registered network device is then authorized to play protected digital content.

16 Claims, 5 Drawing Sheets

U.S. PATENT DOCUMENTS

2005/0198510 A1* 9/2005 Robert et al. ............... 713/175
2006/0047957 A1* 3/2006 Helms et al. ............... 713/165

FOREIGN PATENT DOCUMENTS

WO     WO 00/58811     10/2000
WO     WO 01/52021 A1     7/2001

OTHER PUBLICATIONS

Managing Digital Rights in Online Publishing, "How two publishing houses maintain control of copyright" *Information Management & Technology*, 2001, 34(4), 168-169.

Jakobsson, M. et al., "Proprietary Certificates", *Topics in Cryptology*, 2002, 164-181.

Kumik, P. "Digital Rights Management", *Computers and Law*, 2000, 11(4), 14-15.

Torrubia, A. et al., "Cryptography regulations for E-commerce and digital rights management", *Computers & Security*, 2001, 20(8), 724-738.

Zwollo, K. "Digital document delivery and digital rights management", *Information Services & Use*, 2001, 9-11.

Griswold, G.N. "A Method for Protecting Copyright on Networks", *IMA Intellectual Property Project Proceedings*, 1994, 1(1), 169-178.

Kahn, R.E. "Deposit, Registration and Recordation in an Electronic Copyright Management System", *IMA Intellectual Property Project Proceedings*, 1994, 1(1), 111-120.

Evans, P. "DRM: Is the Road to Adoption Fraught with Potholes?" *Seybold Reporting Analyzing Publishing Technologies*, 2001, 1(14), 32.

Fowler, T.B. "Technology's Changing Role in Intellectual Property Rights", *IT Professional(IEEE)*, 2002, 4(2), 39-44.

Gable, J. "The Digital Rights Conundrum", *Transform Magazine*, 2001, 10(11), 27.

Gunter, C.A., et al. "Models and Languages for Digital Rights", *Proceedings of the 34th Annual Hawaii International Conference on System Sciences*, 2001, 1-5.

Peinado, M. "Digital rights management in a multimedia environment", *SMPTE Journal*, 2002, 111(3), 159-163.

Royan, B. Content creation and rights management; experiences of SCRAN(the Scottish Cultural Resources Access Network), *Program*, 2000, 34(2), 131-142.

Valimaki, M. et al., "Digital rights management on open and semi-open networks", *WIAPP*, 2001, 154-155.

Yu, H. "Digital multimedia at home and content rights management", *IEEE, Proceedigns 2002 IEEE 4th International Workshop on Networked Appliances*, 2002, 49-56.

Hwang, C. et al., "Protection of Digital Contents on Distributed Multimedia Environment", *Proceedings of the IASTED International Conference, Internet and Multimedia Systems and Applications*, Nov. 19-23, 2000, Las Vegas, Nevada, USA, pp. 127-132.

Comino, N. et al., "A Novel Data Distribution Technique for Host-Client Type Parallell Applications", *IEEE Transactions on Parallel and Distributed Systems*, 2002, 13(2), 97-110.

U.S. Appl. No. 10/778,783, filed Feb. 13, 2004, Arnaud, R. et al.

\* cited by examiner

METHOD AND SYSTEM FOR DEVICE REGISTRATION WITHIN A DIGITAL RIGHTS MANAGEMENT FRAMEWORK

CROSS REFERENCE TO RELATED APPLICATIONS

This application shares some subject matter with co-owned U.S. patent application Ser. No. 10/827,167, filed Apr. 19, 2004, entitled "Rendering Protected Digital Content Within a Network of Computing Devices or the Like" and is incorporated herein by reference in its entirety.

FIELD OF THE INVENTION

The invention relates to the field of data transfer between computing machines. More specifically, the invention relates to a system and method for registering devices useful in transferring protected digital content.

BACKGROUND OF THE INVENTION

Digital content producers, such as music and video producers, want the ability to control the distribution of their digital content so that unauthorized consumers cannot easily get pristine digital copies of their digital products. For example, it may be desirable to implement a system that limits the number of digital media players allowed to transfer digital content. In such a system, it should not be possible for one person to acquire protected digital content, acquired via subscription or purchase, and pass the legitimately acquired copy of digital content to an unlimited number of digital devices or consumers.

In addition, digital content producers, such as music labels and studios, are also concerned with the emerging home digital ecosystem. The home media ecosystem (HME) allows an authorized user to play her legitimately acquired digital content in any locale within the ecosystem. The concerns in this environment include the fear that the HME may serve as a distribution platform for unauthorized use. For example, a authorized user of a HME could misuse the HME to acquire protected digital content and then distribute it outside of the HME to other customers or to an unlimited number of digital media players.

One answer to these concerns is to include a full digital rights management (DRM) system in the HME to preclude, at least, the initial unauthorized acquisition of a protected digital work. However, excessive restrictions on the use of that legitimately acquired digital work may make the purchasing consumer feel as if he does not really own what he purchased. But, some reasonable restrictions should be placed on the purchased digital content to protect the intellectual property rights of the content producers. Today, some digital content distribution systems have limited solutions to address some of the unauthorized use concerns. For example, a single distributing agent, such as a web site, can supply digital content to only one specific type of digital media playback device. Although there is no limit to the total number of devices or consumers having the devices, this approach limits the consumer from legitimately using multiple types of devices for playback. Thus, the owner of the digital media device may feel overly restricted in using her digital ecosystem. Another approach is to limit the total number of transfers of digital content to specific devices. This too, by itself, may be overly restrictive in some circumstances of authorized consumer use. Today, consumers frequently download digital content to their local personal computers (PCs) and then distribute the content to the media players of their choice. However, this practice also opens the door to unauthorized distribution and use as noted above.

Thus, there is a need for a system and method that restrains the unauthorized use of digital content yet allows flexibility in use to a consumer.

SUMMARY OF THE INVENTION

An aspect of the invention includes a method and system to allow protected digital content to be played on a network device after device registration. A network device, connected to a digital rights management system (DRMS), sends a digital certificate to the DRMS. The digital certificate is validated and a cryptographic seed may be sent to the device to be registered. Authorization for use of the network device is acquired via a user interface associated with the DRMS. Upon authorization, the DRMS conducts a test to determine if the proximity of the network device is sufficiently close to the DRMS to indicate that the network device is to be part of a target DRMS. The network device may then be registered if the proximity check verifies that the network device is near the DRMS.

In another embodiment, an unlimited number of network devices may be registered, but only a fixed number of network devices may be operated at any one time. A device may fail to be permitted to play protected content if the total number of registered network device that are actively playing digital content is exceeded. In another embodiment, a network device may be taken off line so that another device may be able to play protected digital content.

In another embodiment, a portable device may be registered by sending a unique user identification to the DRMS system. The portable device may be registered if the total number of registered devices may be fixed so that only N registered devices may play content. Registration will be denied to that device which exceeds the allocated number. In another aspect of the invention, if a device is un-registered, a new device may not be registered until after a cooling off period has expired.

BRIEF DESCRIPTION OF THE DRAWINGS

The foregoing summary, as well as the following detailed description of exemplary embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Embodiments of the Invention

In one embodiment of the invention, a system and method of registering devices that are capable of playing protected digital content may serve as a solution to the problem of restraining unauthorized distribution while allowing the consumer the flexibility to use her purchased digital content in an accommodating manner. In a secure Home Media Ecosystem (HME) where Digital Rights Management (DRM) is used to protect content from unlawful distribution, it should not be possible for one person to acquire protected content on a PC or Digital Media Receiver (DMR) and then transfer that content at will to an unlimited number of portable or networked devices. However, digital content consumers should not be unreasonably restricted from enjoying and managing content within their immediate HME. Unlike traditional solutions which merely limit the total number of transfers to a device and may interfere with the well-intended management of the content, aspects of the current invention limit the number of unique DMRs and portable devices that are permitted to access the protected content and registers only networked devices within a certain location or proximity to the PC.

In an aspect of the current invention, device registration permits a limited number of unique streaming or storage devices to have access to DRM protected content on a PC at any time. The registration procedure will uniquely and securely identify storage and streaming devices connected to the PC. In another aspect, a registration method only permits the registration for those network attached DMRs that are storage or streaming capable and that are within a given proximity.

Figure 1:
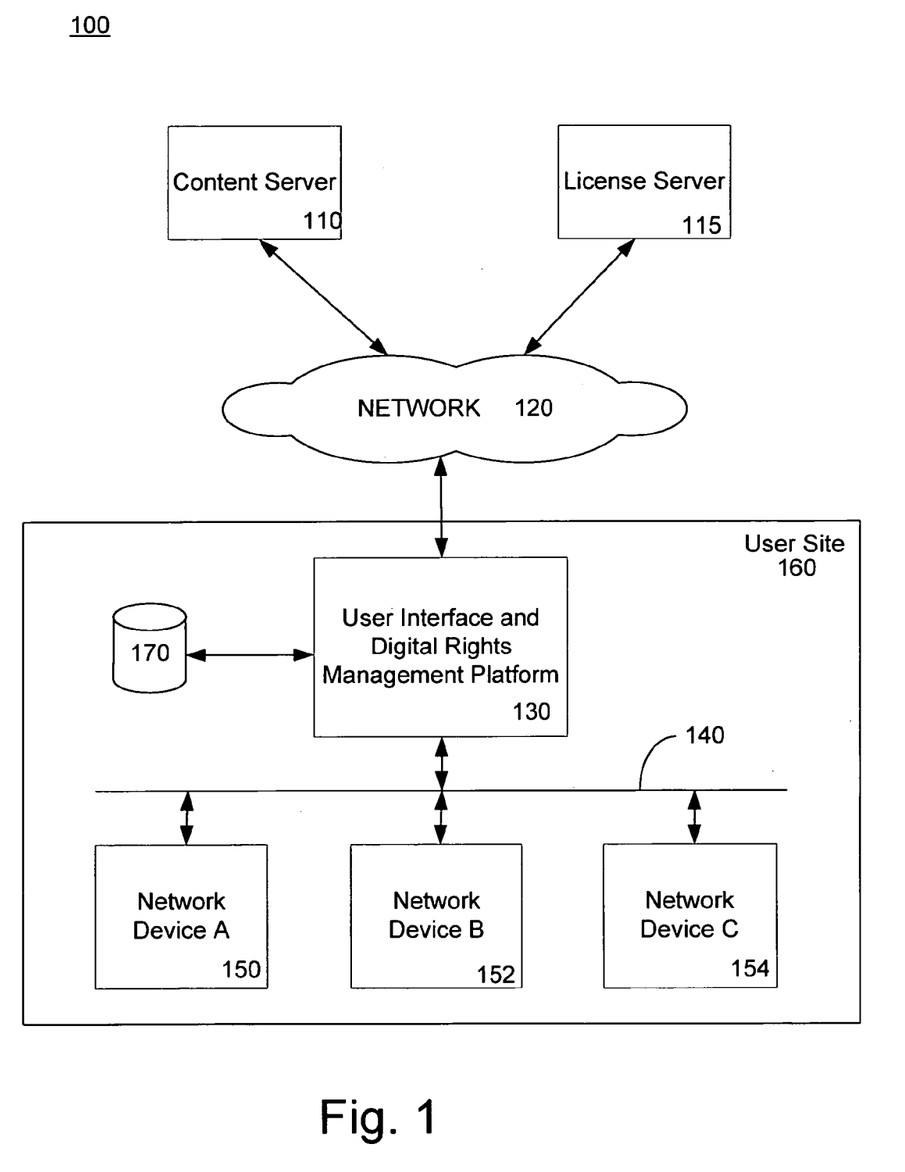
FIG. 1 is an exemplary digital rights management system having networked devices.

FIG. 1 depicts a digital rights management system 100 including a home media ecosystem (HME) according to the present invention. A user site 160 includes a home media ecosystem by including a user interface and digital rights management platform 130, a local storage device 170, a communication link 140 and network devices 150, 152, and 154. The user interface and digital rights management platform may include a personal computer and its well known user interface support mechanisms such as I/O devices and software as well as a DRM platform. The DRM platform may be software loaded onto the PC or it may be a specific combination of hardware and software that comprises the DRM system to which a PC interconnects. The local storage 170 may be separate or combined within either the PC or the DRM system.

The network devices 150, 152 and 154 are devices that attach to the communications link 140 and communicate with the platform 130. The network devices are considered receiving and rendering devices for digital content. Examples of such devices include video and audio players with a communications interface to link 140.

In the embodiment shown in FIG. 1, digital content can originate from a content server 110. The platform 130 can access digital content by using network 120 and access both a license for the digital content from a license server 115 and the digital content itself from the content server. In one embodiment, the content server 110 and the license server may be at the same location or may be the same server.

Digital content may be in the form of audio, video, multimedia, digital text, digital data, or other form of content known to those of skill in the art. Digital content may be transferred from a digital server 110 to a DRM platform 130 as a transfer between a cooperating transmitter and receiver pair. Co-owned U.S. patent application Ser. No. 10/827,167, filed Apr. 19, 2004, entitled "Rendering Protected Digital Content Within a Network of Computing Devices or the Like" discloses a system and method for secure digital content transferal between a transmitting computing device and a receiving computing device and is incorporated herein by reference in its entirety.

The aforementioned incorporated reference application teaches a method where the transmitter transmits protected digital content to the receiver in a manner such that the receiver can access the digital content. The digital content is encrypted and decryptable according to a content key (KD). In the method, the receiver sends a session request to the transmitter, where the session request includes an identification of the content to the transmitter, an action to be taken with the content, and a unique identification of the receiver. The transmitter receives the session request from the receiver, determines from the unique identification of the receiver in the session request that the receiver is in fact registered to the transmitter, obtains a digital license corresponding to the identified content in the session request, reviews policy set forth in the license to determine that the license allows the transmitter to provide access to the content to the receiver and also allows the action in the session request, and sends a session response to the receiver, where the session response includes the policy from the license, the unique identification of the receiver, and the content key (KD) for decrypting the encrypted content, (KD) being protected in a form obtainable by the receiver.

The transmitter obtains the content encrypted according to (KD) to result in (KD(content)), and sends (KD(content)) to the receiver. The receiver receives the session response and (KD(content)), retrieves the policy and the protected content key (KD) for decrypting the encrypted content from the session response, confirms that the policy allows the receiver to render the content, obtains the content key (KD), applies (KD) to (KD(content)) to reveal the content, and then in fact renders the content in accordance with the policy. The teachings of the incorporated and above-referenced U.S. Patent Application serve as backdrop for the registration process according the present invention.

Figure 2:
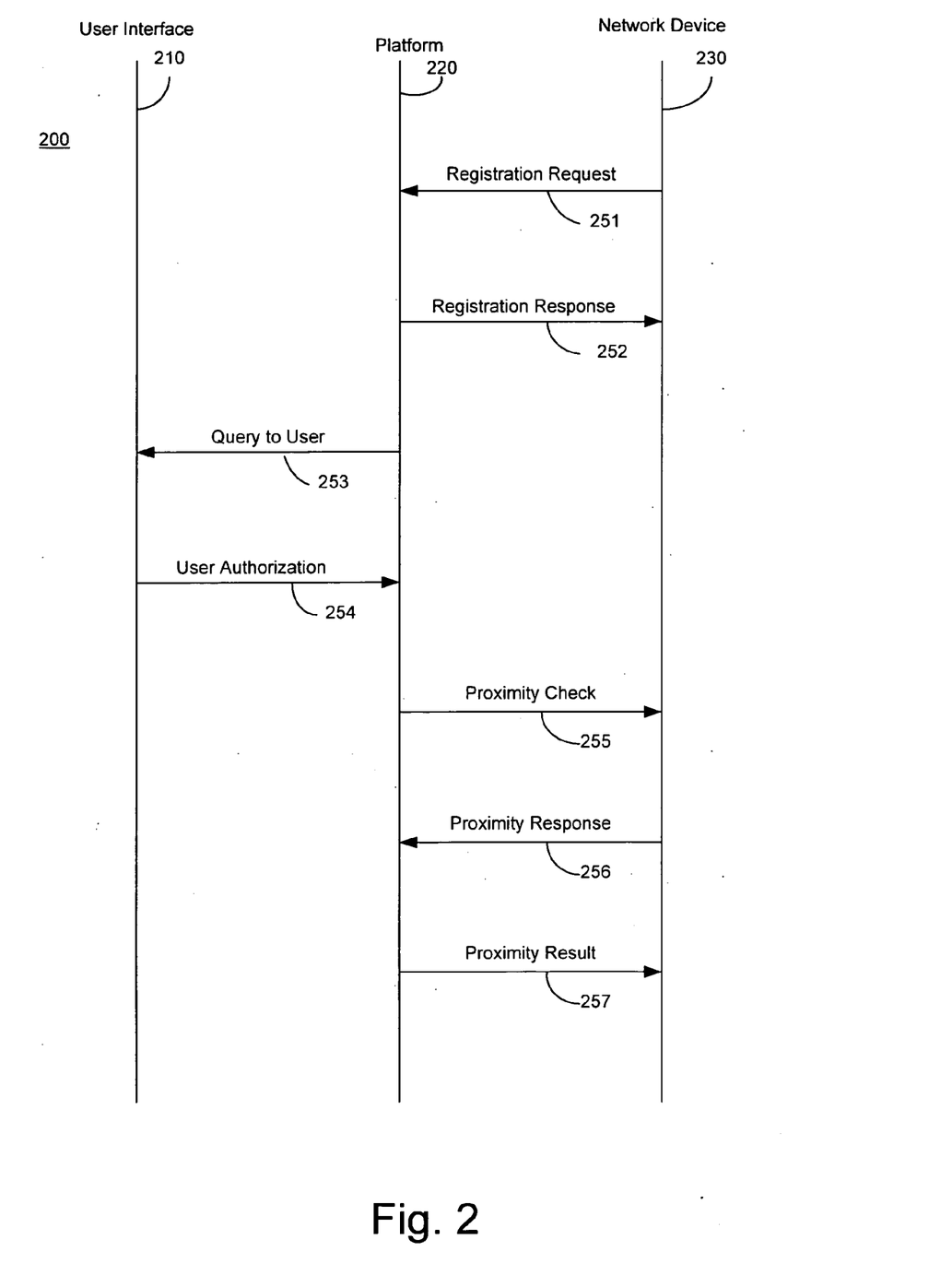
FIG. 2 is an exemplary message exchange protocol according to an aspect of the invention.

FIG. 2 depicts a message exchange protocol 200 for an exemplary network device registration process according to the invention. Three points of message exchange are exemplified in FIG. 2; a user interface 210, a DRM platform 220 and a network device 230. The user interface 230 may be any point at which a user of a DRM system may communicate with the system. Such an interface may include, but not be limited by, a computer interface having a mouse, keyboard, touch screen, remote control, or other man to machine interface. The platform 220 may be a software or combination of hardware and software platform including a digital rights management system. The network device 230 may be any device having the capability to communicate over a communication medium to the platform. Examples of network devices are audio, video or multimedia devices communicating on a network via either hardline or wireless communications mediums.

Initially, a network device may be connected and, after power up, initiates a registration request message 251. The network device is preferably registered with the DRM system before the device is allowed to receive any digital content.

The registration request message is thus sent by the network device 230 to the platform 220 and initiates the registration process by sending a digital certificate and a unique certificate identifier. In one embodiment, a unique 128-bit serial number is provided for a given certificate. Manufacturers of network devices may use the same certificate for multiple devices with each device having a unique serial number. The digital certificate is a certificate of trust and may be an XML document. The certificate is used to ensure that only certified parties can access the protected digital content. Verification of a digital certificate may include a verification that the certificate matches a root certificate of trust generated by a manufacturing authority.

In response to the receipt of the registration request 251, a registration response 252 is generated by the platform 220 and sent to the network device 230 if the certificate is accepted. In one embodiment, the registration response message contains an encryption seed, a session identifier, the certificate serial number and a digital signature authenticating the message. The encryption seed may be used by the network device to derive the content encryption key and content integrity key. The encryption method used between the platform and the network device is used to encrypt the protected digital content when it is transferred from the DRM platform to the network device. A session identifier is used to uniquely identify the communication session between the platform and the network device. The certificate serial number is sent to verify that the correct certificate is being referenced.

After the DRM platform 220 and the network device 230 exchanges the registration request and response messages, the network device can be registered on the DRM system if the user approves the registration. Thus, after authenticating the network device as compatible and secure, the platform 220 queries the user with a message 253. The query message is sent to the user interface 210 and asks for user input to approve the registration of the network device. In one embodiment, the form of the request to the user may be a display on the user interface 210 that alerts the user to the possible new network device registration possibility.

The user can choose to register or not register the network device. A user authorization message 254 may be sent via the user interface 210 to the platform 220 affirming the user's desire to register the device. If a user chooses to register the network device a proximity check message 255 is sent from the platform 220 to the network device 230. The proximity check performed by the platform verifies that the network device is electrically proximate to the platform. This determination can be performed by measuring the response time provided by a return message from the network device. The response time can be an indication of the closeness of the network device to the platform. If a network device has a long delay time in responding to the proximity check message, then the platform may conclude that the network device is not local to the platform and is therefore not eligible to receive protected digital content. In one embodiment, the proximity check message contains a field that indicates that an immediate response is required. The proximity check message may also include the session identifier.

The network device 230 responds immediately with a proximity response message 256. In one embodiment, the response message may contain a value expected by the platform and a session identifier that indicates the correct network device is responding. Upon receipt of the proximity response, the DRM platform, or equivalently, a content server, performs a delay measurement and determines if the network device is proximate to the platform and is therefore eligible to receive protected digital content. If the device is not proximate, then the network device cannot be registered on the DRM system and cannot receive content. If the device is proximate, then an affirmative proximity result message 257 may be sent with a coded message indicating an affirmative registration. In either case, a proximity result message may be sent indicating the positive or negative results of the proximity check. In one embodiment, the proximity check is performed multiple times and a statistical evaluation, performed by the DRM platform, determines if the network device meets a proximity test sufficiently to warrant registration of the device on the DRM system.

In the event that the network device does become registered, then the network device is able to receive encrypted digital content. The digital content may be acquired via a DRM system and a digital content provider and may be selected for playback by a digital content consumer.

In one aspect of the current invention, the DRM system uses network device registration to limit the number of unique network attached devices in the home that can have access to the protected content on a given PC or other user interface. This will help to enable protected content to flow throughout a home media ecosystem to a number of devices without restriction. The total number of active devices may be dictated and enforced by the DRM system itself. For example, the DRM system may limit the total number of actively registered devices which can play protected digital content to ten network devices. There may be no limit to the number of registered devices, but there may be a limit to the number of registered devices that are actively engaged in protected digital content delivery or playback.

In an exemplary scenario, a user in an HME environment may connect a new network theater device to the home network, and powers on the device. Within seconds the user may be asked to register the new device on his PC interface which is used by the DRM system. At the PC interface, the user may be presented with a registration wizard that walks the user through the process described above. After successfully registering the device, for the first time, the user can now play protected audio and video content on his network theater device.

In one aspect of the invention, the DRM system can periodically re-validate the registration of a registered device. This may be performed independently of the user and allows the DRM system to verify the integrity of the network devices connected to it.

In one aspect of the invention, if the maximum number of active devices is ten and an eleventh device attempts playback of digital content, the user is alerted that the total number of active devices is exceeded but that removal of one of the active devices can allow playback of digital content from the newest device. In this scheme, a maximum number of active devices, ten in this example, may playback digital content. Deactivation of one of the ten devices allows a new device, the new tenth device, to simultaneously play digital content.

In another possible scenario, if for whatever reason, the user decides to disconnect the newest device, she can re-activate the device that was previously removed from active playback. In one embodiment, the user simply cycles power off then on to the un-registered device and the registration process described above is repeated and the device is re-registered.

In another aspect of the invention, if a user attempts to take a registered device from a first location, say his first home, to a second location, say his second home, and attempts to connect the network device having protected content in storage, the device will not allow the protected content to be played. This results from the use of the proximity test built into the registration process. In this exemplary instance, the revalidation of the network device may fail because the proximity test fails. The proximity test fails because the device is no longer within the same proximity of the DRM system or content server. The DRM system or the content server, in evaluating the proximity test data, can note not only the change in delay time, but also the difference in session identifier thus indicating that a change in revalidation and/or proximity has occurred.

Figure 3:
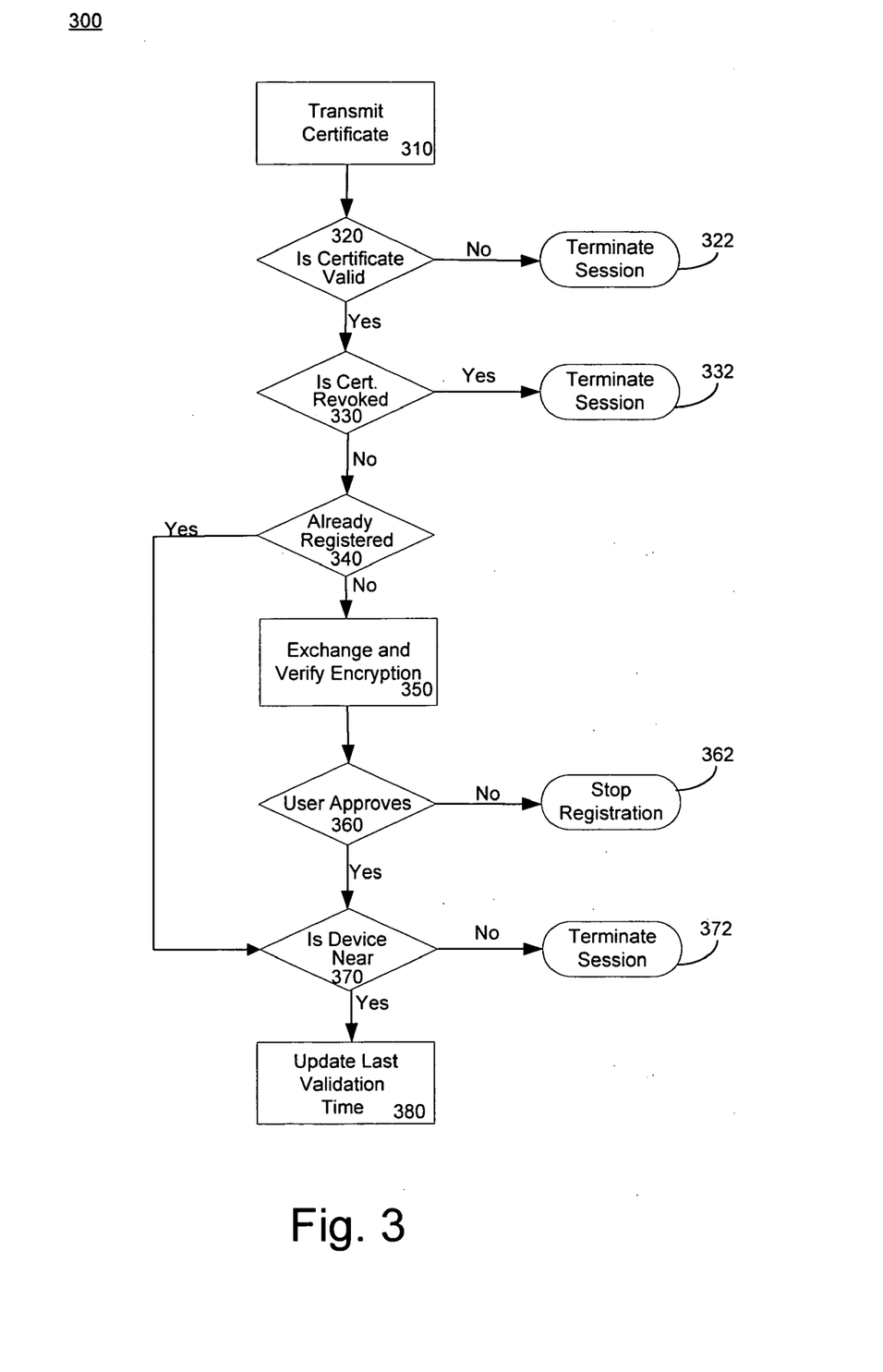
FIG. 3 is an exemplary flow diagram according to aspects of the invention.

FIG. 3 is an exemplary method of registration or revalidation of a network device according to aspects of the invention. Considering the method of registration first, a network device may be attached to a DRM system and turned on. The network device sends a digital certificate to authenticate itself to the DRM system (step 310). The DRM determines if the certificate is valid (step 320). If the certificate is invalid, the process terminates (step 322). If the certificate is valid, the DRM determines if the device has a revoked certificate (step 330). If the certificate is revoked, the process terminates (step 332). If the network device is not revoked, the DRM determines if the device is already registered (step 340). In the case of a new network device being installed, the device would not be already registered and the method 300 would proceed towards device registration.

As discussed above, registration of a network device includes the exchange of cryptographic information (step 350). After the device receives cryptographic information, the user must approve the registration of the device (step 360). If the user does not approve, the registration process stops for that device (step 362). If the user approves the device, a proximity check is performed (step 370) to determine the relative distance, in time, of the network device to the DRM system. If the network device is not within a predetermined tolerance for a network device, then the proximity check fails and the session terminates (step 373). If the device is within a predetermined limit for time delay of a device close to the DRM system, then the validation time and proximity measurements are recorded (step 380).

Revalidation of a network device that is registered may be performed by the DRM system at any time. A revalidation of a network device would repeat steps 310 through 330 to determine if the certificate of the network device was still valid. Since the device was previously registered, the method 300 can detect this at step 340 and move directly to the proximity test of step 370. Here, the proximity test can be performed and the DRM system can compare previous results to the new results. Also, the DRM can compare the proximity results to a pre-set standard and determine if the network device is within a time domain tolerance of the DRM system. As before, if the proximity test fails, the session is terminated and the device falls out of active registration (step 372). If the device passes the proximity test, the test results and validation time are recorded (step 380).

In another aspect of the invention, portable devices, such as mobile personal audio or video players may be used in conjunction with a DRM system. In one embodiment, a single user can register several different types of portable media players, however, a limited number of total devices may be registered. Upon attempt to register a portable device that is in excess of the number allowed, the new registration would be denied. This reduces the total number of devices to which a user may download protected content.

Figure 4:
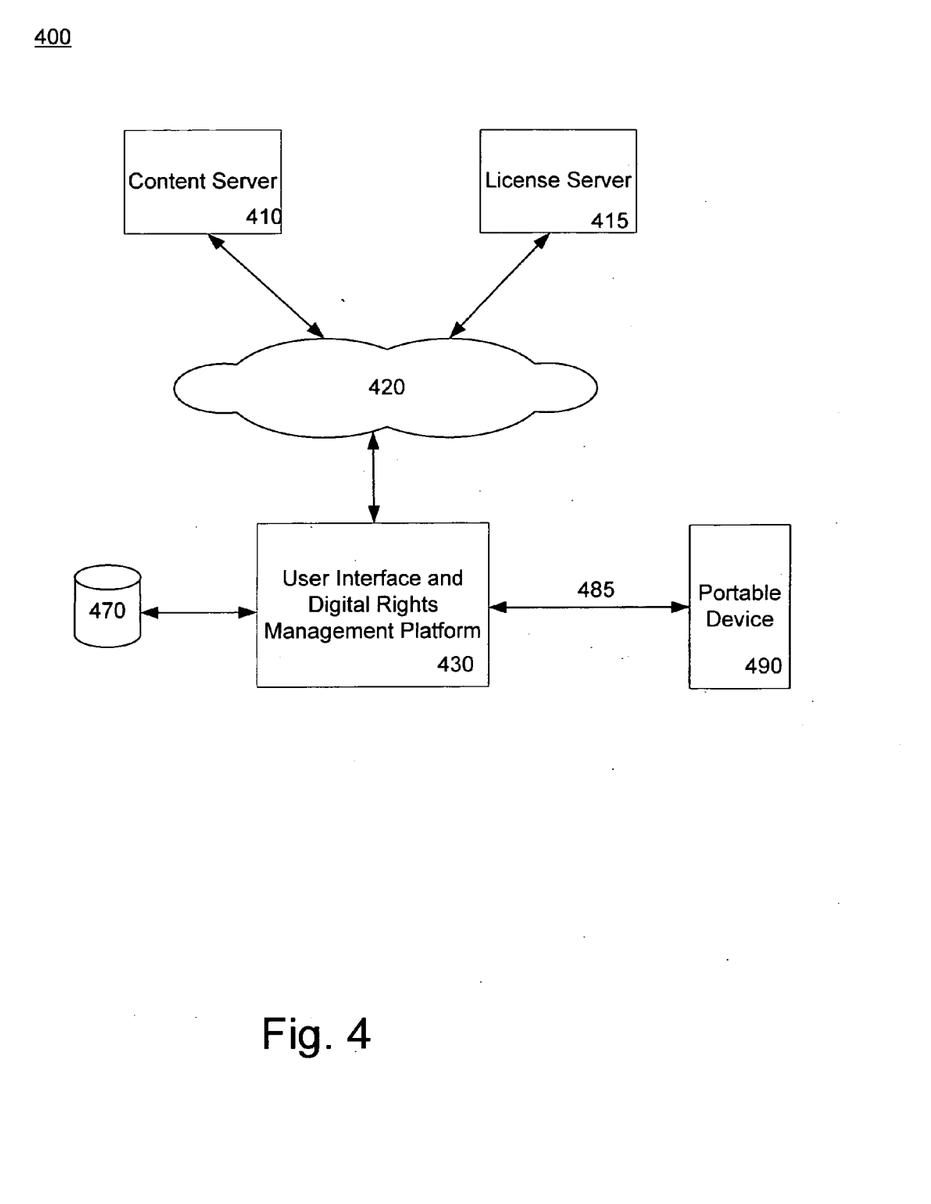
FIG. 4 is an exemplary digital rights management system interfacing to portable devices.

FIG. 4 depicts an embodiment 400 which includes a DRM platform 430 to which a portable device 490 may be connected. As before, digital content may be downloaded from a combination of a content server 410 and a license server 415 via network 420 such as the internet. A local storage unit 470 may be used as storage for the digital content and/or registration information. In one embodiment, the portable device may be connected to the user interface and DRM platform via use of a connection 485. Connection examples may include, a hard wire connection, such as USB or FireWire or a wireless connection such as infrared or RF wireless.

Registration of the device can occur when the device is connected to the DRM platform. The portable device 490 may send a unique identifier (UID) to the DRM platform. The platform 430 can identify the device type and verify compatibility with the device. The user may then be asked to authorize the registration of the portable device. The user interface of the platform 430 may be used for this request and inform a user. The platform 430 can monitor the total number of devices registered so that, for example, only a total of ten devices may be registered. If an eleventh device is desired to be registered by a user, then the registration is denied.

The DRM platform 430 may be asked by the user to un-register one device so that a new device may be included in the registered ten devices. However, if a new tenth device is desired to be registered, the DRM platform 430 may deny registration for a cooling off period before registering a new device after cancellation of registration of a tenth device. For example, the cooling off period may be 72 hours. This cooling off period may prevent a user from accommodating the immediate request of a friend to download protected content that was not properly licensed to the friend.

In another aspect of the invention, registration of the portable device 490 allows digital content, such as a song or video to downloaded to the registered portable device an unlimited number of times. This allows a user to reset and reload or reassemble a play list of his favorite protected digital content without have to pay for the digital content multiple times. In another embodiment, the total number of downloads of digital content may be limited to any one specific registered device, but it may be set to a reasonably large amount to offer flexibility to the digital content user.

Exemplary Computing Device

Figure 5:
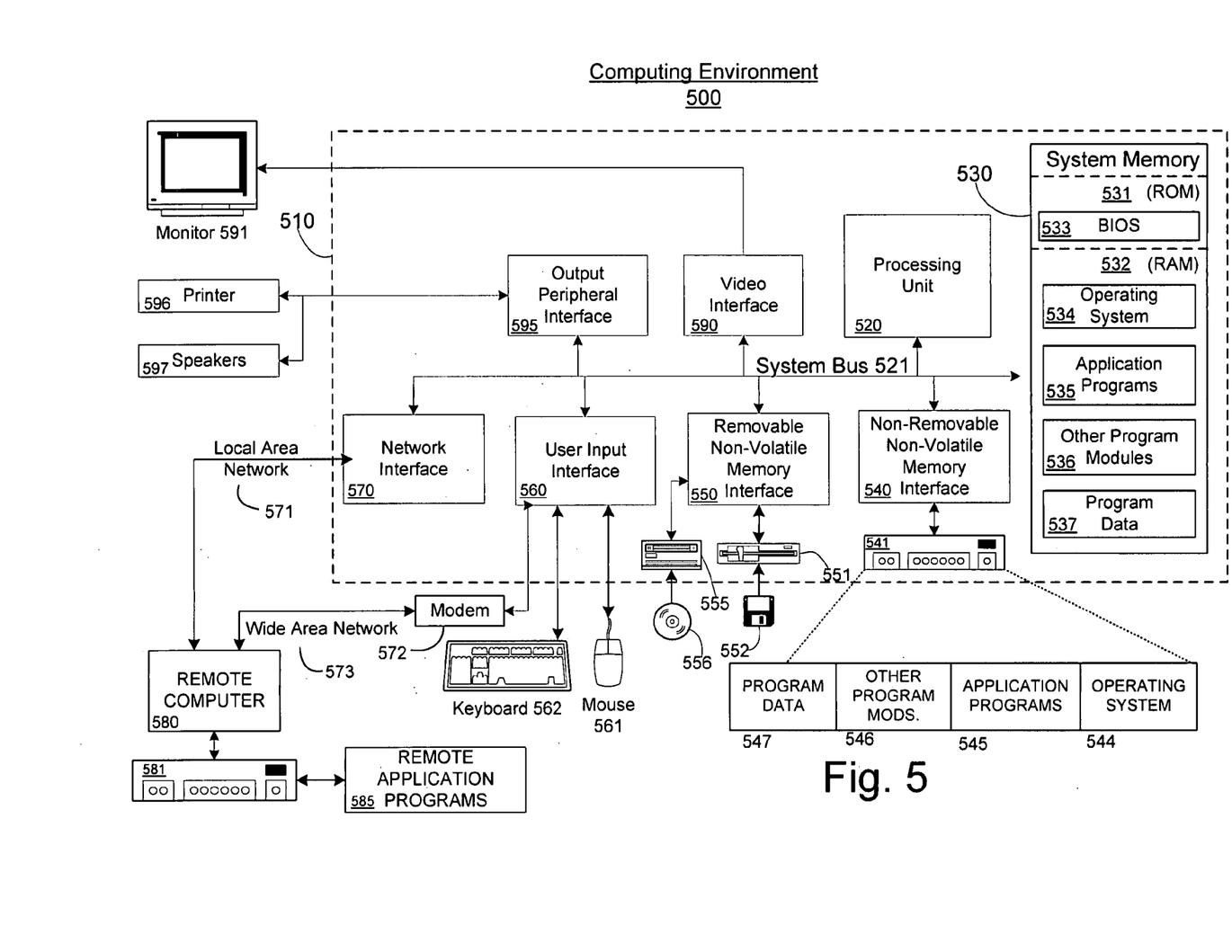
FIG. 5 is a block diagram showing an exemplary computing environment in which aspects of the invention may be implemented.

FIG. 5 and the following discussion are intended to provide a brief general description of a suitable computing environment in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 5 thus illustrates an example of a suitable computing system environment 500 in which the embodiments of the invention may be implemented, although as made clear above, the computing system environment 500 is only one example of a suitable computing environment and is not intended to suggest any limitation as to the scope of use or functionality of an embodiment of the invention. Neither should the computing environment 500 be interpreted as having any dependency or requirement relating to any one or combination of components illustrated in the exemplary operating environment 500.

With reference to FIG. 5, an exemplary system for implementing an embodiment of the invention includes a general purpose computing device in the form of a computer system 510. Components of computer system 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 510 typically includes a variety of computer readable media. Computer readable media can be any available media that can be accessed by computer system 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer system 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer system 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5 provide storage of computer readable instructions, data structures, program modules and other data for the computer system 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer system 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB). A monitor 591 or other type of display device is also connected to the system bus 521 via an interface, such as a video interface 590, which may in turn communicate with video memory (not shown). In addition to monitor 591, computer systems may also include other peripheral output devices such as speakers 597 and printer 596, which may be connected through an output peripheral interface 595.

The computer system 510 may operate in a networked or distributed environment using logical connections to one or more remote computers, such as a remote computer 580. The remote computer 580 may be a personal computer, a server, a router, a network PC, a peer device or other common network node, and typically includes many or all of the elements described above relative to the computer system 510, although only a memory storage device 581 has been illustrated in FIG. 5. The logical connections depicted in FIG. 5 include a local area network (LAN) 571 and a wide area network (WAN) 573, but may also include other networks/buses. Such networking environments are commonplace in homes, offices, enterprise-wide computer networks, intranets and the Internet.

When used in a LAN networking environment, the computer system 510 is connected to the LAN 571 through a network interface or adapter 570. When used in a WAN networking environment, the computer system 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer system 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a method to register portable or network devices in a DRM related system. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method of registering a network device in a digital rights management system (DRMS) connected to a network, the method comprising:
    receiving at the DRMS a digital certificate from a first network device;
    determining a validity of the digital certificate;
    requesting and receiving an authorization from a user interface to register the first network device;
    determining if a location of the first network device is proximate to a location of the DRMS; and
    registering the first network device if the first network device location is proximate to the DRMS location, wherein upon being registered the first network device becomes eligible to play protected digital content.

2. The method of claim 1, further comprising:
    denying registration of the first network device upon any one of a failure to validate the certificate, a failure to authorize registration, and a failure to verify proximity to the DRMS.

3. The method of claim 1, wherein determining the validity of the certificate comprises a verification that the digital certificate matches a root digital certificate of trust generated by a manufacturing authority.

4. The method of claim 1, wherein determining the validity of the certificate comprises a verification that the digital certificate has not been revoked.

5. The method of claim 1, further comprising:
sending to the first network device cryptographic information comprising a cryptographic seed.

6. The method of claim 1, wherein requesting and receiving authorization from a user interface to register the first network device comprises:
generating a request to register the first network device, the request being displayed via the user interface; and
receiving an indication of authorization via the user interface.

7. The method of claim 1, wherein determining if the first network device location is proximate to the DRMS location comprises:
transmitting a request for information to the first network device over the network;
receiving a response to the request from the first network device;
determining a delay time for the response; and
determining if the delay time indicates if the network device location is proximate to the DRMS location.

8. The method of claim 1, further comprising:
using the first network device to receive and play protected digital content.

9. The method of claim 1, further comprising:
registering additional network devices, each device having a verified certificate, authorization to register and proximity to the DRMS;
using up to N of the registered network devices to play digital content transferred from the DRMS to the respective registered network device; and
denying one of transfer and play of digital content to an N+1 registered device, wherein the DRMS permits only N registered device to concurrently play digital content.

10. A computer system having a digital rights management system (DRMS), the system comprising:
a DRMS connected to a network;
a plurality of network devices, each network device connected to the network and each device having a digital certificate;
a user interface connected to the DRMS; and
a processor having access to memory, the memory having instructions which when executed, perform a method comprising:
receiving at the DRMS the digital certificate from each network device requesting registration;
determining the validity of each certificate;
generating a request to register each device, each request being displayed on the user interface;
receiving an indication of authorization for registration via the user interface;
determining if each location of each network device is proximate to a location of the DRMS; and
registering each network device that has a verified digital certificate, is authorized, and is proximate to the DRMS location, wherein upon being registered each registered network device becomes eligible to play protected digital content and wherein a limit is imposed on one or both of a number of registered network devices and a number of registered network devices permitted to concurrently access the protected digital content.

11. The system of claim 10, further comprising:
denying registration of a network device upon any one of a failure to validate its certificate, a failure to authorize its registration, and a failure to verify its proximity to the DRMS location.

12. The system of claim 10, wherein the step of determining the validity of each certificate comprises a verification that the digital certificate matches a root digital certificate of trust generated by a manufacturing authority.

13. The system of claim 10, further comprising:
sending to each network device cryptographic information comprising a cryptographic seed.

14. The system of claim 10, further comprising:
periodically re-validating the registration of each registered network device.

15. The system of claim 10, wherein determining if each location of each network device is proximate to a location of the DRMS comprises:
transmitting a request for information to each network device over the network;
receiving a response to the request from each network device;
determining a delay time for each response; and
determining if each delay time indicates if each network device is proximate to the DRMS.

16. The system of claim 10, further comprising:
using each network device to receive and play protected digital content without exceeding the imposed limit.

* * * * *